(12) United States Patent
Clancy

(10) Patent No.: US 8,701,717 B2
(45) Date of Patent: Apr. 22, 2014

(54) ROADSIDE REPAIR KIT FOR RESTORING TIRE BEAD INTEGRITY

(71) Applicant: Patrick Clancy and Georgene Pappas, a partnership, Mattituck, NY (US)

(72) Inventor: Patrick Clancy, Mattituck, NY (US)

(*) Notice: Subject to any disclaimer, the term of this patent is extended or adjusted under 35 U.S.C. 154(b) by 0 days.

(21) Appl. No.: 13/932,643

(22) Filed: Jul. 1, 2013

(65) Prior Publication Data

US 2013/0292908 A1 Nov. 7, 2013

Related U.S. Application Data

(62) Division of application No. 13/317,808, filed on Oct. 28, 2011, now Pat. No. 8,474,494.

(60) Provisional application No. 61/520,208, filed on Jun. 6, 2011.

(51) Int. Cl.
| | |
|---|---|
| B65B 1/04 | (2006.01) |
| B60C 5/00 | (2006.01) |
| B60C 25/00 | (2006.01) |
| B65B 3/26 | (2006.01) |
| F16J 15/46 | (2006.01) |
| B60C 25/14 | (2006.01) |
| B60C 5/16 | (2006.01) |

(52) U.S. Cl.
CPC . *B65B 3/26* (2013.01); *F16J 15/46* (2013.01); *B60C 25/145* (2013.01); *B60C 5/16* (2013.01)
USPC .............. 141/1; 141/38; 277/583; 152/513; 157/1.1

(58) Field of Classification Search
CPC .............. B65B 3/26; F16J 15/46; B60C 5/16; B60C 25/145
USPC ................. 141/1, 38, 287; 177/253; 152/513; 157/1.1
See application file for complete search history.

(56) References Cited

U.S. PATENT DOCUMENTS

| | | |
|---|---|---|
| 940,602 A | 11/1909 | Kirsch |
| 2,822,192 A | 2/1958 | Beatty |
| 2,825,941 A | 3/1958 | Lux |
| 3,038,732 A | 6/1962 | Scott |
| 3,077,219 A | 2/1963 | William |
| 3,081,816 A * | 3/1963 | Branick .......................... 157/1.1 |
| 3,106,237 A | 10/1963 | Holmes |

(Continued)

FOREIGN PATENT DOCUMENTS

WO   PCTUS2012046932   7/2012

OTHER PUBLICATIONS

Mile-X Equipment, Inc., Cheetah CH-5 Tire Bead Seater, www.mile-x.com, 2 pages.

(Continued)

*Primary Examiner* — Timothy L Maust
(74) *Attorney, Agent, or Firm* — Alfred M. Walker

(57) ABSTRACT

A sealing tube is wrapped around the rim and inflated such as to seal the gap between tire and rim if the seal between the tire bead and rim has lost its integrity. After this, the tire can be inflated to specified pressure at a slow rate using a portable compressor. The repair can be done at roadside on any vehicle using inflatable tires usually without demounting the wheel or even jacking up the defective wheel.

12 Claims, 3 Drawing Sheets

(56) References Cited

U.S. PATENT DOCUMENTS

| | | | |
|---|---|---|---|
| 3,161,229 A | 12/1964 | Sanders | |
| 3,596,698 A * | 8/1971 | Jordan | 157/1.1 |
| 3,602,692 A | 8/1971 | Morey | |
| 3,651,849 A * | 3/1972 | Kaminskas | 157/1.1 |
| 3,722,895 A | 3/1973 | Mevissen | |
| 3,828,116 A | 8/1974 | Lonow | |
| 3,933,392 A | 1/1976 | Wells | |
| 3,948,305 A | 4/1976 | Watts | |
| 4,042,003 A | 8/1977 | Gaskill | |
| 4,127,166 A | 11/1978 | Wyman | |
| 4,142,569 A | 3/1979 | Walther | |
| 4,151,870 A | 5/1979 | Watts | |
| 4,209,052 A | 6/1980 | French | |
| 4,271,884 A | 6/1981 | Udall | |
| 4,295,509 A | 10/1981 | Stein | |
| 4,327,793 A | 5/1982 | Wyman | |
| 4,351,382 A | 9/1982 | Corner | |
| 4,469,152 A | 9/1984 | Hardee | |
| 4,498,516 A * | 2/1985 | Parker | 157/1.1 |
| 4,506,719 A | 3/1985 | Gaither | |
| 4,674,549 A | 6/1987 | Bush | |
| 4,797,987 A | 1/1989 | Bush | |
| 5,000,240 A | 3/1991 | Jones | |
| 5,060,706 A | 10/1991 | Jones | |
| 5,072,764 A | 12/1991 | Ochoa | |
| 5,074,773 A | 12/1991 | Tischler | |
| 5,343,920 A | 9/1994 | Cady | |
| 5,634,506 A | 6/1997 | Augier | |
| 5,636,673 A | 6/1997 | Augier | |
| 5,816,561 A | 10/1998 | Kinsel | |
| 6,550,510 B2 | 4/2003 | Champion | |
| 7,332,047 B2 | 2/2008 | Majumdar | |
| 7,398,809 B2 | 7/2008 | Steinke | |
| 7,441,318 B2 | 10/2008 | Lovell | |
| 2004/0103967 A1 | 6/2004 | Majumdar | |
| 2006/0174996 A1 | 8/2006 | Lovell | |
| 2006/0289099 A1 | 12/2006 | Steinke | |
| 2008/0066842 A1 | 3/2008 | Steinke | |
| 2008/0308232 A1 | 12/2008 | Lovell | |
| 2009/0178750 A1 | 7/2009 | Taylor | |

OTHER PUBLICATIONS

Automative Dealership Programs, Rema Tip Top Bead Seaters, AllTireSupply.com, 1 page.
Automotive Dealership Programs, AA Doughnut-Style Bead Seater, AllTireSupply.com, 2 pages.
Toolsource, Ken-Tool Tire Bead Seater for 14 to 15 in Rims, www.toolsource.com, 2 pages.
Mile-X Equipment, Inc., Cheetah CH-5 Tire Bead Seater, www.mile-x.com, 2 pages, Oct. 12, 2011.
Automative Dealership Programs, Rema Tip Top Bead Seaters, AllTireSupply.com, 1 page, Oct. 12, 2011.
Automotive Dealership Programs, AA Doughnut-Style Bead Seater, AllTireSupply.com, 2 pages, Oct. 12, 2011.
Toolsource, Ken-Tool Tire Bead Seater for 14 to 15 in Rims, www.toolsource.com, 2 pages, Feb. 21, 2011.

* cited by examiner

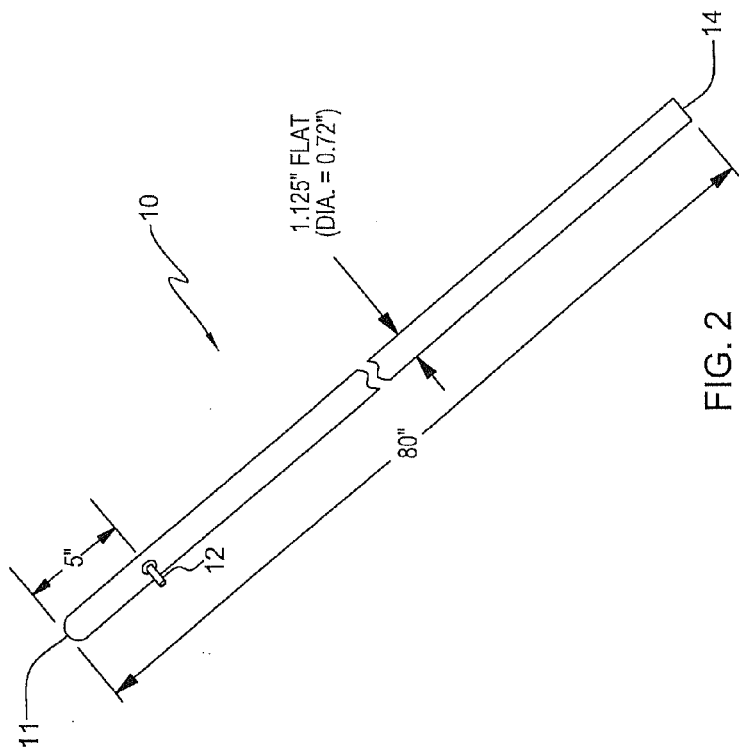
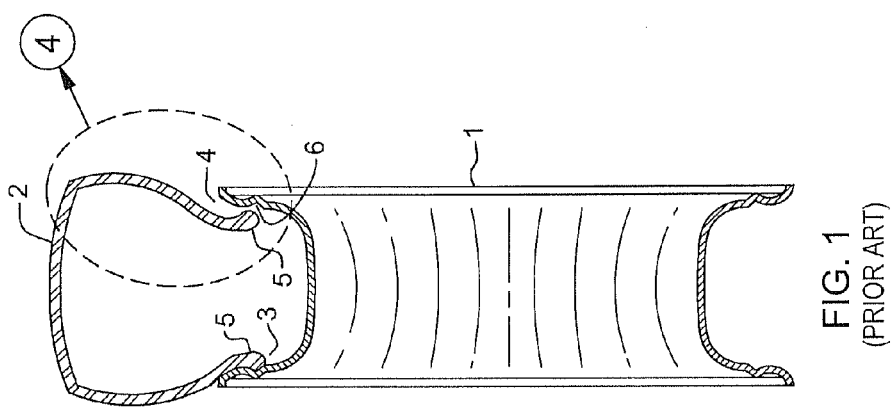

ROADSIDE REPAIR KIT FOR RESTORING TIRE BEAD INTEGRITY

RELATED APPLICATIONS

This application is a divisional of U.S. patent application Ser. No. 13/317,808, filed on Oct. 28, 2011, now U.S. Pat. No. 8,474,494 of Jul. 2, 2013, and claims priority under 35 U.S.C. §120, and claim priority therefrom, which application claimed benefit and priority of provisional application Ser. No. 61/520,208, filed Jun. 6, 2011 under 35 U.S.C. §119(e). These applications are incorporated by reference herein.

FIELD OF THE INVENTION

The present invention relates to a roadside repair kit for restoring tire bead integrity.

BACKGROUND OF THE INVENTION

At times, vehicle tires lose the integrity of the seal between the tire bead and the formed contact retaining ring region on the rim. The tire then goes flat and cannot be re-inflated using a normal tire compressor since the gap between tire bead and rim leaks air profusely and prevents the pressure from building up in a normal fashion.

This "loss of bead" is caused by various events such as hitting a pot hole at speed, rolling over a boulder off-road or on typical farm paths, or just due to a slow leak causing a flat tire. Especially on large trucks or busses with tandem wheels, a tire going flat is often masked by the adjacent tire. Since the "flat" tire of a tandem pair is loose, there is a high likelihood of bead loss upon acceleration or deceleration.

Besides tire mounting machines at tire shops, other devices and methods have been used to restore tire bead integrity and re-inflate tires. For example, the Cheetah Tire Bead Seater consists of a 10 gallon tank holding pressurized air at up to 160 psi with a large diameter exit tube ending in a flat flared opening that is fitted between the tire and the rim on the side of bead loss. A high flow dump valve is then opened to quickly blast the tankful of air into the tire at such a high rate to overwhelm the gap air loss and expand the tire so that the tire bead is again seated against the rim and the tire is inflated.

Rema Tip Top bead seaters fit around a tire and compress the tire thread around the circumference thereby forcing the side walls outward into contact with the rim. This closes the rim/tire bead gap permitting inflation of the tire by a normal compressor at a slow rate.

The AA Doughnut-style bead seater is a large rubber O-ring of appropriate size to be stretched onto the rim adjacent to the tire to provide a temporary seal between tire and rim. Inflation of tire then pops out the AA bead seater.

A backyard method uses a squirt of pressurized liquid butane into the tire that has lost its bead contact. The butane vaporizes and combines with ambient air to form an explosive mixture which is then ignited thereby popping the tire into place instantly if the proper amount of butane were used.

The Cheetah device is heavy, bulky, and quite expensive. The Rema Tip Top units must be sized for a particular range of tire sizes; they require jacking or removal of the tire in question, and at way over $100, they are expensive. The AA Doughnut rubber ring devices usually require the use of lubricant to permit them to slide on the rim inner surface; they must be sized to the rim in use, and they cannot be used on inner surfaces or tires of a tandem pair without removing the tire since the axle is an interference. The backyard method described is quite dangerous.

The present invention is a low cost disposable kit which mitigates or eliminates the shortcomings of the prior art devices and methods.

OBJECTS OF THE INVENTION

The main objective of the present invention is to provide an alternative to the expensive proposition of having to call in roadside service to overcome the problem of loss of tire bead/rim integrity.

While a passenger vehicle usually has a spare tire that can be changed by the driver, larger trucks do not have this option since even the weight of the wheel and tire combination precludes such a solution.

Another objective is to provide an inexpensive disposable kit that is truly "one-size fits all".

Other objects which become apparent from the following description of the present invention.

SUMMARY OF THE INVENTION

In keeping with these objects and others which may become apparent, the present invention includes a long narrow flexible inflatable sealing tube which is fitted around the rim and between the tire and the rim to seal the tire to the rim temporarily while the tire is being inflated in a normal fashion. One end of the sealing tube is sealed shut and has a normal tire inflation valve (Schrader valve) attached at right angles a few inches away. The distal end of the sealing tube is left open. Although material and dimensions are not critical to the invention, in the preferred embodiment the sealing tube is butyl rubber 1.125" wide when flattened out (0.72" outer diameter when minimally inflated) and approximately 80" long. Wall thickness is approximately 0.038". Other elastomers with high friction surface such as polyurethane or latex can also be used. A spring clamp for sealing the open end of the sealing tube (after folding over) is also included in the kit. A pair of scissors would also be a handy addition to the kit. A compressor as for tire inflation is also used. Since large trucks have a built-in compressor, this is not included in the kit, but a small vehicle-powered compressor which plugs into the cigarette lighter can be separately purchased for this application. A manually operated tire pump can be used instead as well.

The method of this invention involves fitting the sealing tube around the periphery of the rim adjacent to the tire wall near the bead. The ends of the sealing tube are crossed over each other and then it is inflated such that the gap between rim and tire is sealed. Then the compressor is detached from the sealing tube and is used to inflate the tire. If the leakage is still too high to support the tire inflation at the rate of the compressor, the long open tail end of the sealing tube can be wrapped around the inflated portion of the sealing tube to cause more snugness. A second sealing tube may have to be used on the opposite face of the rim as well if this does not close the leakage problem from one side only. (Usually the tire is pushed against the rim on the opposite face sufficiently to seal bead to rim to support inflation.) Note that all of these procedures can be handled while the tire is still on the vehicle. In most cases, especially with tandem tires, the wheel does not even have to be jacked off the ground. This is much easier than changing a tire on a passenger vehicle. Since a wrapping motion of the sealing tube is used around the rim, axles are not an encumbrance and both faces of both tires can be sealed. The circumference of the tire need not be jacked off the ground.

After sealing and tire inflation to recommended pressure for the vehicle and tire in question, any or all of the sealing tube that is loose can be pulled off from between tire and rim. If a section is stuck, it can be left in place since the tire bead may be sealing through it to the rim. The objective of this invention is not to perform a final repair at roadside, but to enable a vehicle with a tire that had lost its bead to be driven a reasonable distance to have a proper inspection and repair, if necessary, at a repair station without incurring the cost of calling a roadside maintenance crew.

The steps of the method for restoring tire bead integrity in a tire on a vehicle, without removal of a wheel, include the following:

a) while the tire and rim are still on the vehicle, fitting a first section of a long narrow flexible inflatable sealing tube around the rim, between the rim and the tire adjacent the bead of the rim, the sealing tube being closed at one end and open at an opposite end, the closed end of the sealing tube exiting away from the rim, the open and closed ends of the sealing tube crossing each other, and an inflation valve extending from the sealing tube between the closed end of the sealing tube and where the sealing tube exits the rim;

b) closing off the open end of the sealing tube;

c) feeding compressed gas into the sealing tube through the inflation valve sufficient to close off and seal any gap between the rim and tire;

d) then feeding the compressed gas into the tire until normal tire pressure is obtained;

e) removing any excess length of sealing tube from the rim; and f) resuming operation of the vehicle.

Thereafter, the vehicle can be optionally driven to a repair facility, or alternatively, a repair crew is brought for roadside service, where the tire is removed from the rim, the sealing tube is removed, and the tire is remounted.

Preferably, a second section of sealing tube is fitted around the rim at the opposite face in the event inflation of the first section does not completely seal the tire on the rim.

In order to close off the open end of the sealing tube, a the aforementioned clip can be employed.

The tire being serviced can be either a single tire, or one of two tires of a tandem pair of tires on a trailer truck or similar vehicle, wherein access permits either tire to be repaired at either face or at both faces. Furthermore, the sealing tube, when fitted onto the rim, optionally extends beyond an edge of the tire so that the sealing tube is visible when the tire is reinflated.

BRIEF DESCRIPTION OF THE DRAWINGS

The present invention can best be understood in connection with the accompanying drawings. It is noted that the invention is not limited to the precise embodiments shown in drawings, in which:

FIG. 1 is an edge view of a rim with a top portion (including tire) in crossection illustrating a properly seated tire on one side and "loss of bead" on the other face.

FIG. 2 is a plan view of the sealing tube of this invention.

DETAILED DESCRIPTION OF THE INVENTION

Figure 5:
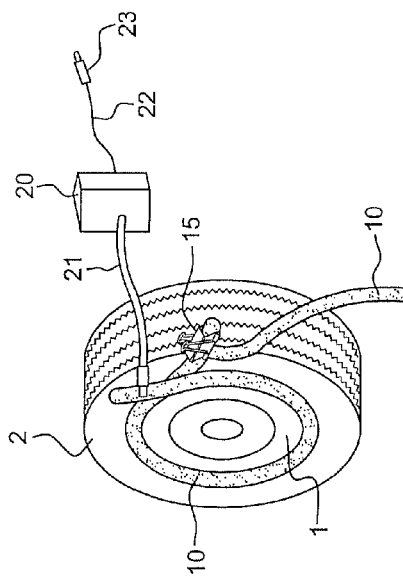
FIG. 5 shows a perspective view of a tire with sealing tube in place attached to a compressor.

FIG. 1 shows an end view of tire rim 1 with tire 2 normally seated at 3 with bead 5 in contact with rim 1 and with a "bead loss" failure at site 4 showing a gap between bead 5 and retaining groove 6 in rim 1.

FIG. 2 shows the principal part of the kit of this invention. It is sealing tube 10 with closed end 11, open end 14 and Schrader valve 12. Valve 12 is displaced a short distance from sealed end 11 to facilitate handling when fitting around rim 1.

Figure 3:
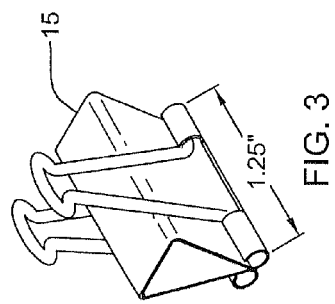
FIG. 3 is a perspective view of a spring clip for use in sealing the open end of the sealing tube.

FIG. 3 shows a spring clip that can be used to seal the open end of sealing tube 10, although many types can be used, the least expensive stationery type clip is shown here.

Figure 6:
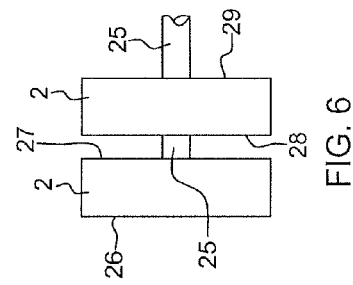
FIG. 6 is a schematic rear view of a pair of tandem tires illustrating the access to the various tire faces.
Figure 4:
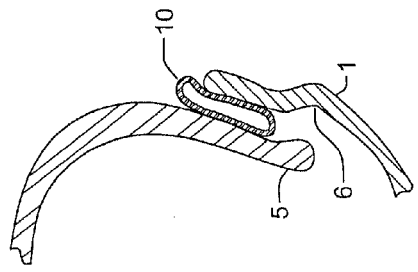
FIG. 4 is a crossection detail showing the sealing tube in place sealing the gap between tire and rim.

FIGS. 4 and 5 show the sealing tube of this invention in use. FIG. 4 shows a detail of the intended placement of tube 10 relative to a separated tire 2 and rim 1. FIG. 5 shows tire 2 with sealing tube 10 wrapped around rim 1 with tube 10 sealed end crossed over under rim edge. Clip 15 is used to seal the open end (after folding over once or twice). Schrader valve 12 is connected to outlet hose 21 of portable compressor 20 with electric cable 22 leading to cigarette lighter plug 23. Note a tandem wheel arrangement of FIG. 6. Both faces 26 and 27 of the outer tire 2 can be fitted with a sealing tube 10. Similarly, both faces 28 and 29 of inner tire 2 can be fitted with sealing tube 10 since axle 25 is not an obstacle to the rim wrapping procedure.

Figure 7:
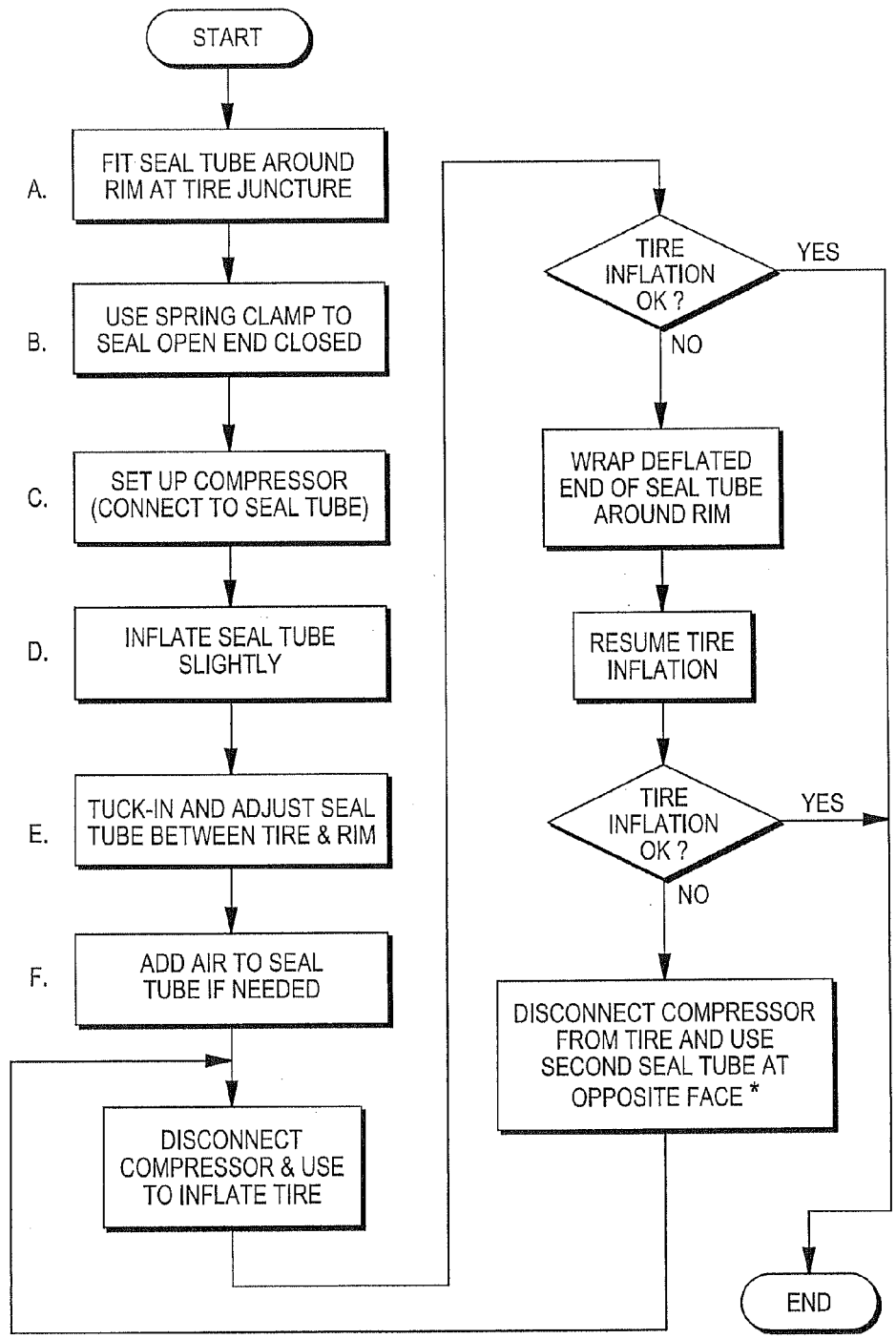
FIG. 7 is a flow chart illustrating the method of use of the present invention to restore tire bead integrity.

FIG. 7 is a flow chart detailing the procedure for using the sealing tube 10 of this invention to do a roadside repair of a tire "bead loss" situation. The steps are self-explanatory and also represent the additional steps that can be tried if tire inflation is still problematic after the first sealing tube is installed. These extra steps consist of using the dangling tail of the sealing tube to add more bulk to sealing the first face. If even that is insufficient, a second sealing tube is used at the opposite face of the same tire.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:

1. A method for roadside repair for restoring tire bead integrity of a tire having an inner circumferential bead edge, in combination with a motor vehicle having a set of wheel rims and tires inflatable over and attached thereto, said tire being inflatable over a corresponding bead edge of a vehicle rim, said method comprising the steps of:

fitting a linearly extending and cylindrical sealing tube with a sealed closed end and an open end around a periphery of the corresponding bead edge of said vehicle rim adjacent to the tire wall near said bead; said sealing tube assuming a crossection which is a circumferentially isotrophic cylindrical shape when inflated;

crossing respective ends of the sealing tube over each other;

inflating said sealing tube through a tire inflation valve spaced apart and near said sealed closed end with a compressor such that the gap between rim and tire is sealed; said long narrow linearly extending flexible inflatable sealing tube assuming an isotrophic toroidal shape when fitted and wrapped around said rim;

detaching said compressor from said sealing tube and inflating said tire after sealing and tire inflation to recommended pressure for the vehicle and pulling off said sealing tube from between said tire and said rim.

2. The method as in claim 1, further comprising the step of providing a second sealing tube on an opposite face of the rim.

3. A method for restoring tire bead integrity in a tire on a vehicle in combination with a motor vehicle having a set of wheel rims and tires inflatable over and attached thereto, without removal of a wheel, comprising the steps of:

while the tire and rim are still on said vehicle, fitting a first section of a long narrow flexible inflatable linearly extending and cylindrical sealing tube with a sealed closed end and an open end around said rim, between the rim and said tire adjacent the bead of said rim, said sealing tube assuming a crossection which is a circumferentially isotrophic cylindrical shape when inflated; said sealing tube being closed at one end and open at an opposite end, the closed end of said sealing tube exiting away from said rim, the open and closed ends of said sealing tube crossing each other, and an inflation valve extending from said sealing tube between the closed end of said sealing tube and where said sealing tube exits said rim;

closing off the open end of said sealing tube;

feeding compressed gas into said sealing tube through said inflation valve sufficient to close off and seal any gap between said rim and tire;

then feeding said compressed gas into said tire until normal tire pressure is obtained; and resuming operation of said vehicle.

4. The method of claim 3 in which said vehicle is driven to a repair facility or a repair crew is brought for roadside service, where said tire is removed from said rim for repair if needed, and the tire is remounted.

5. The method of claim 3 in which a second section of sealing tube is fitted around said rim at the opposite face in the event inflation of the first section does not completely seal the tire on said rim.

6. The method of claim 3 in which a clip is employed to close off the open end of the sealing tube.

7. The method of claim 3 in which a portable compressor operating off a power outlet on said vehicle is employed to inflate said sealing tube and said tire.

8. The method of claim 3 wherein said sealing tube is about 1.125" when flattened out and an outer diameter of about 0.72" when minimally inflated.

9. The method of claim 8 wherein said tube has a wall thickness of about 0.038".

10. The method of claim 3 in which said tire being serviced is one of two tires of a tandem pair wherein access permits either tire to be repaired at either face or at both faces.

11. The method of claim 3 in which the sealing tube when fitted onto said rim extends beyond an edge of said tire so that said sealing tube is visible when said tire is re-inflated.

12. A method for restoring tire bead integrity in a tire for use with a vehicle having a wheel rim, comprising the steps of:

fitting a first section of a long narrow flexible linearly extending and cylindrical inflatable sealing tube with a sealed closed end and an open end around said rim, between the rim and said tire adjacent the bead of said rim, said sealing tube being closed at one end and open at an opposite end, the closed end of said sealing tube exiting away from said rim, the open and closed ends of said sealing tube crossing each other, and an inflation valve located near and extending from said sealing tube between the closed end of said sealing tube and where said sealing tube exits said rim, near the closed end thereof;

closing off the open end of said sealing tube;

feeding compressed gas into said sealing tube through said inflation valve sufficient to close off and seal any gap between said rim and tire;

then feeding said compressed gas into said tire until normal tire pressure is obtained.

\* \* \* \* \*